(12) United States Patent
Kosarev et al.

(10) Patent No.: US 9,811,340 B2
(45) Date of Patent: Nov. 7, 2017

(54) METHOD AND APPARATUS FOR RECONSTRUCTING REAL PROGRAM ORDER OF INSTRUCTIONS IN MULTI-STRAND OUT-OF-ORDER PROCESSOR

(75) Inventors: Nikolay Kosarev, Yoshkar-Ola (RU); Jayesh Iyer, Bangalore (IN); Sergey Shishlov, Moscow (RU); Andrey Kluchnikov, Moscow (RU); Alexander Butuzov, Moscow (RU); Boris A. Babayan, Moscow (RU); Vladimir Penkovski, Folsom, CA (US); Sergey V. Bulenkov, Moscow (RU)

(73) Assignee: Intel Corporation, Santa Clara, CA (US)

( * ) Notice: Subject to any disclaimer, the term of this patent is extended or adjusted under 35 U.S.C. 154(b) by 1310 days.

(21) Appl. No.: 13/525,825

(22) Filed: Jun. 18, 2012

(65) Prior Publication Data

US 2013/0339711 A1  Dec. 19, 2013

(51) Int. Cl.
*G06F 9/38* (2006.01)
*G06F 9/32* (2006.01)

(52) U.S. Cl.
CPC ............... *G06F 9/38* (2013.01); *G06F 9/321* (2013.01); *G06F 9/3834* (2013.01); *G06F 9/3851* (2013.01); *G06F 9/3855* (2013.01)

(58) Field of Classification Search
CPC ..... G06F 9/3834; G06F 9/3851; G06F 9/3855
See application file for complete search history.

(56) References Cited

U.S. PATENT DOCUMENTS

| | | | | |
|---|---|---|---|---|
| 6,301,654 | B1 * | 10/2001 | Ronchetti et al. | ............ 712/225 |
| 8,078,849 | B2 * | 12/2011 | Libby | ..................... G06F 9/262 |
| | | | | 712/234 |
| 2008/0294881 | A1 * | 11/2008 | Chen et al. | ................... 712/227 |
| 2009/0063735 | A1 * | 3/2009 | Ng et al. | ......................... 710/54 |
| 2010/0262807 | A1 * | 10/2010 | Burky et al. | .................. 712/205 |
| 2013/0151823 | A1 * | 6/2013 | Beaumont-Smith et al. 712/240 |

* cited by examiner

*Primary Examiner* — Jacob A Petranek
(74) *Attorney, Agent, or Firm* — Patent Capital Group

(57) ABSTRACT

A computer system, a processor in a computer and a computer-implemented method executable on a computer processor involve dividing a set of computer instructions arranged in a sequential program order into a plurality of instruction sequences. Instructions within each sequence are arranged according to the program order. An increment value is assigned to a preceding instruction in each sequence. The increment value is equal to a difference between a program order value of a subsequent instruction in the sequence and a program order value of the preceding instruction. The processor calculates the program order value of each subsequent instruction based on the program order value and the increment value of a corresponding preceding instruction in the same sequence.

21 Claims, 8 Drawing Sheets

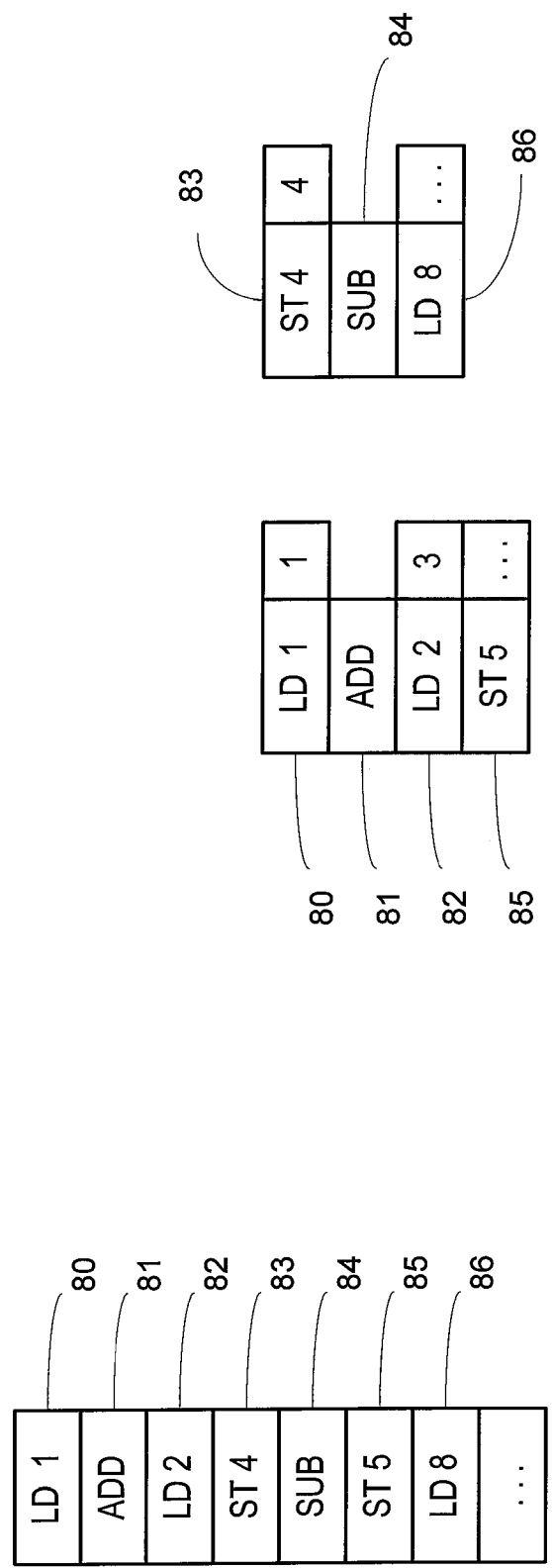

METHOD AND APPARATUS FOR RECONSTRUCTING REAL PROGRAM ORDER OF INSTRUCTIONS IN MULTI-STRAND OUT-OF-ORDER PROCESSOR

BACKGROUND INFORMATION

To boost processor performance, contemporary general-purpose computer architectures try to exploit instruction-level parallelism (ILP), which characterizes the inherent parallelism of a program algorithm by scheduling instructions for execution out-of-order (OoO), i.e., in an order that is different from the order of instructions in the original program code, which is sequential.

As load instructions may have unpredictable latencies due to cache misses, the ability to reorder them with store instructions efficiently is of high importance as it can give significant performance benefits due to increased overlapping of execution between independent instructions. A load instruction can be reordered to execute before another load instruction that precedes it in the program order without violating any data dependencies. However, data dependencies may arise in the following scenarios: when a load is reordered to execute before a preceding store, a store is reordered to execute before a preceding load, or a store is reordered to execute before a preceding store. In such instances, the true, output, or anti-data dependencies respectively could be violated if the two instructions access the same memory location (i.e. have overlapping memory address ranges). This incorrect reordering of memory instructions (accessing the same memory location) to exploit ILP may lead to wrong execution of a program. Thus for any processor using storage elements (memory or registers) for passing data from one instruction to another, right memory access is crucial to ensure correct execution semantics.

The data dependencies described above often require that memory access instructions be reordered at the execution stage and/or the retirement stage of a processor pipeline. If instructions are reordered incorrectly for execution, the instructions may be executed using incorrect data (e.g., source operands). Similarly, as instructions are retired from the pipeline, the contents of the instructions must be committed (written into the storage elements) in the correct order so as to maintain memory consistency.

Previous approaches for ordering memory accesses can be found in general-purpose superscalar architectures, Very Long Instruction Word (VLIW) architectures, some implicitly multithreaded architectures such as multiscalar, and various research architectures that use Speculative Versioning Cache (SVC) or a variant of SVC. These approaches have significant limitations, which prevent them from being used for ordering memory accesses in multi-strand OoO processors.

In superscalar and VLIW processors, instructions are fetched in-order, and the information for correct retirement (or commit) of memory instructions is naturally provided through intentional ordering of the instructions in a single, sequential stream by the compiler.

In superscalar processors, the memory instructions are arranged based on the order of instructions in the stream by giving each instruction a dynamic sequence number. The ordering of memory instructions is usually performed in a buffer, which keeps each instruction along with the address of the associated memory access. The entries of the buffer are indexed by the sequence number. The buffer can also be split into two: one for load instructions, called load buffer (LDB) or load queue, and the other for store instructions, called store buffer (STB) or store queue. If a load instruction is to be issued, the buffer is checked to ensure that no earlier store (which has a lower sequence number) to the same address or an unresolved address is pending. If a store instruction is to be issued, the buffer is checked to ensure that no earlier load or store (which has a lower sequence number) to the same address or an unresolved address is pending.

Because superscalar and VLIW processors rely on fetching instructions strictly in-order to extract the relative order of load and store instructions from the total order of instruction in the program, it is difficult to extract the same information for a multi-strand OoO processor which fetches instructions OoO.

Multiscalar processors issue loads speculatively, with the expectation that a predecessor task won't store a value into the same memory location at a later time. A check must be made dynamically to ensure that no predecessor task writes a value into a memory location, at a future time, currently being read by a successor task. If this check identifies dependent load and store instructions that don't occur in the proper program order, the later task must be squashed and appropriate recovery action must be initiated. The squashing of a task results in the squashing of all tasks in execution following the task.

In the multiscalar processor, update of the data cache by processing elements isn't performed speculatively. To hold speculative instructions (which belong to other tasks except the head task), check violations of data dependencies and initiate recovery actions, an Address Resolution Buffer (ARB) is used. The ARB holds values of instructions which are speculatively executed, but updates the data cache only when the status of these instructions changes from speculative to non-speculative, i.e., in order of task assignment. The ARB tracks the units which executed the instructions using load and store bits. Data dependence violation is detected by checking these bits. Because the ARB in multiscalar processors only updates the data cache in order of task assignment, the size of the instruction scheduling window would be limited in a multi-strand OoO context, since it wouldn't be possible to initiate speculative execution of a task (e.g., a strand in a thread) without first initiating execution of a previous one. This results in under-utilization of ILP.

Some experimental architectures use hierarchical execution models in which an SVC (or a variant of SVC) is used instead of an ARB. These models use the SVC to order memory accesses between different processors, as the SVC functionality is based on task assignment information. Tasks are committed in assignment order and when a data misspeculation is detected, the successor tasks are squashed. In this manner, SVC guarantees program order among loads and stores from different processors. The order among memory instructions executed by an individual processor is ensured by a conventional combination of a load queue and a store queue.

A multi-strand OoO processor is a machine that processes multiple strands (and instruction pointers) in parallel so that (1) instructions of a strand in respect to instructions of other strands are fetched, issued and executed out of program order; (2) instructions from each individual strand are fetched, issued and executed in the program order in respect to each other. A strand is a sequence of instructions predominantly data dependent on each other that is arranged by binary translator (BT) at program compilation time. Instructions belonging to the same strand are executed by a multi-strand OoO processor in-order. Because the SVC (or variants thereof) commits tasks in assignment order, implementing SVC in a multi-strand OoO processor (where strand assignment order is not known and multiple strands are executing in parallel) would incur huge ILP under-utilization as a result of continuously assigning the strands in order (as is the case with multiscalar processors). Additionally, a huge overhead is incurred in connection with snoop requests between SVCs of each individual strand (which is how the SVC mechanism checks data dependency violations). There is also a strand squashing overhead associated with misspeculation (which is an essential part of any SVC based synchronization mechanism).

Accordingly, a need exists for a method that allows for correct reconstruction of real program order of memory accesses in a multi-strand OoO processor, while facilitating better utilization of ILP.

BRIEF DESCRIPTION OF THE DRAWINGS

FIG. 8A illustrates an example sequence of instructions arranged in program order.

FIG. 8B illustrates an example of how the sequence in FIG. 8A may be split among a plurality of strands.

DETAILED DESCRIPTION OF EXAMPLE EMBODIMENTS

The present invention relates to computer architectures for reconstructing real program order in a multi-strand OoO processor.

Figure 1:
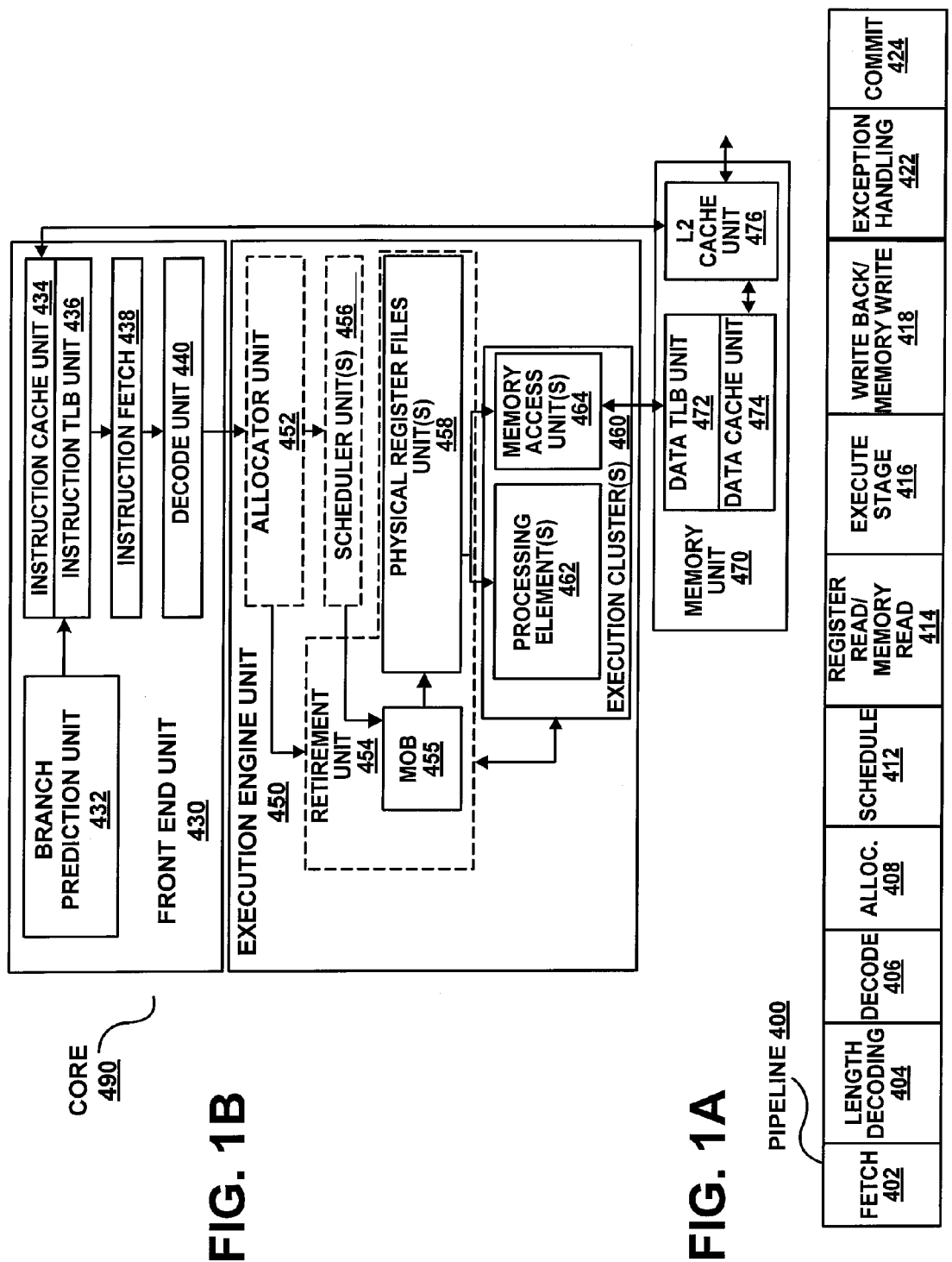
FIG. 1A illustrates elements of a processor execution pipeline according to one embodiment.
FIG. 1B illustrates elements of a processor micro-architecture according to one embodiment.

FIG. 1A is a block diagram illustrating an execution pipeline according to at least one embodiment of the invention. FIG. 1B is a block diagram illustrating a multi-strand OoO architecture core having an out-of-order issue/execution logic to be included in a processor according to at least one embodiment of the invention.

In FIG. 1A, an execution pipeline 400 includes a fetch stage 402, a length decode stage 404, a decode stage 406, an allocation stage 408, a scheduling (also known as a dispatch or issue) stage 412, a register read/memory read stage 414, an execute stage 416, a write back/memory write stage 418, an exception handling stage 422, and a commit stage 424. Although each strand, taken individually, may be fetched, decoded and executed in-order, strands may be fetched and/or executed out-of-order relative to each other.

In FIG. 1B, arrows denote a coupling between two or more units and the direction of the arrow indicates a direction of data flow between those units. FIG. 1B shows processor core 490 including a front end unit 430 coupled to an execution engine unit 450, and both are coupled to a memory unit 470.

The core 490 may be any computing core that supports multi-strand OoO execution of instructions.

The front end unit 430 may include a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 434 is further coupled to a level 2 (L2) cache unit 476 in the memory unit 470. The decode unit 440 is coupled to an allocator unit 452 in the execution engine unit 450.

The execution engine unit 450 includes the allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 458 is overlapped by the retirement unit 454 to illustrate various ways in which out-of-order execution may be implemented (e.g., using a reorder buffer(s) and a retirement register file(s), using a future file(s), a history buffer(s), and a retirement register file(s); using a register maps and a pool of registers; etc.). Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers, combinations of dedicated and dynamically allocated physical registers, etc. The retirement unit 454 and the physical register file(s) unit(s) 458 are coupled to the execution cluster(s) 460. The execution cluster(s) 460 includes a set of one or more processing elements 462 and a set of one or more memory access units 464. The processing elements 462 may perform various operations (e.g., shifts, addition, subtraction, multiplication) and on various types of data (e.g., scalar floating point, packed integer, packed floating point, vector integer, vector floating point). While some embodiments may include a number of processing elements dedicated to specific functions or sets of functions, other embodiments may include only one processing element or multiple processing elements that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The L2 cache unit 476 is coupled to one or more other levels of cache and eventually to a main memory.

By way of example, the exemplary out-of-order issue/execution core architecture may implement the pipeline 400 as follows: 1) the instruction fetch 438 performs the fetch and length decoding stages 402 and 404; 2) the decode unit 440 performs the decode stage 406; 3) allocator unit 452 performs the allocation stage 408; 4) the scheduler unit(s) 456 performs the schedule stage 412; 5) the physical register file(s) unit(s) 458 and the memory unit 470 perform the register read/memory read stage 414; the execution clusters 460 perform the execute stage 416; 6) the memory unit 470 and the physical register file(s) unit(s) 458 perform the write back/memory write stage 418; 7) various units may be involved in the exception handling stage 422; and 8) the retirement unit 454 and the physical register file(s) unit(s) 458 perform the commit stage 424. The retirement unit 454 may include a memory order buffer (MOB) 455 that performs reordering of certain instructions for purposes of retirement, as will be explained below in connection with FIGS. 2 and 5.

It should be understood that the core 490 may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., simultaneous multithreading thereafter such as in the Intel® Hyperthreading technology).

While the illustrated embodiment of the processor also includes a separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 2:
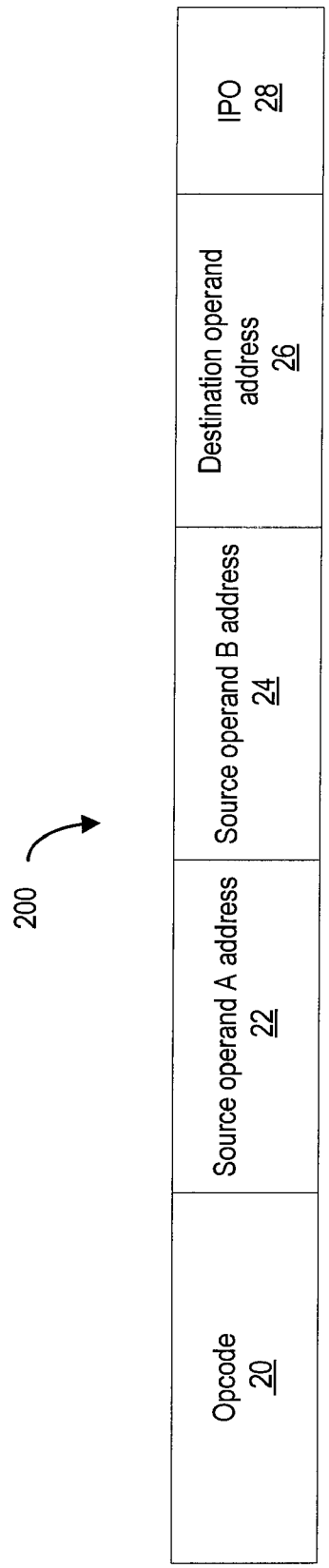
FIG. 2 illustrates an instruction format including program order information according to one embodiment.

FIG. 2 illustrates an instruction format 200 according to one embodiment. A compiler in accordance with the embodiment of FIG. 2 may assign a sequence number named program order (PO), to each of a subset of instructions named program-ordered instructions (PO instructions), which are defined herein as any instruction that accesses memory data (e.g., a load or a store instruction), as well as any instruction that may cause an interrupt. The POs are natural numbers assigned in progressive order, but the sequence of POs need not be consecutive. For example, in FIG. 8A, an example sequence of instructions may include a load 80, an add 81, a load 82, a store 83, a subtract 84, a store 85, and a load 86. The load 80 may be assigned a PO value of 1, the load 82 a PO value of 2, the store 83 a PO value of 4, the store 85 a PO value of 5, and the load 86 a PO value of 8. A compiler may then split this sequence across a plurality of strands. For example, FIG. 8B shows two strands that together form the sequence in FIG. 8A. A first strand may include the load 80, the add 81, the load 82, and the store 85. A second strand may include the store 83, the subtract 84, and the load 86.

Referring back to FIG. 2, the instruction format 200 includes an opcode 20, a first source operand address 22, a second source operand address 24, and a destination operand address 26, all of which are fields in a conventional instruction format. Additionally, the instruction format 200 includes an IPO field which, in accordance with embodiments of the present invention, encodes information relating to the real program order of an instruction. The IPO may be calculated by a compiler from object code at compilation time.

The IPO value does not encode the entire PO of an instruction. Instead, the IPO only encodes an increment value that is equal to the difference between the PO value of the next PO instruction in the same strand and the PO value of the instruction for which the IPO is being calculated. IPO information need not be encoded for non-PO instructions, because PO information is only needed for memory instructions and interruptible instructions in order to maintain the correct order for memory accesses. Thus, arithmetic instructions may not have an IPO value as part of their instruction format. FIG. 8B includes IPO values for each of the PO instructions shown. The load 80 may have an IPO value of 1, the load 82 an IPO value of 3, the store 83 an IPO value of 4, and the load 86 an IPO of 8. Thus, the compiler may split the program into multiple strands for execution on a multi-strand architecture, while preserving the program order information by attaching the IPO field to each PO instruction.

In an alternative embodiment, IPO values may be encoded for non-PO values instead of, or in addition to, PO instructions. For example, in FIG. 8B, the load 80 may be assigned an IPO of 0 and the IPO of 1 shown may instead be assigned to the add 81 to indicate the increment to the next PO instruction, i.e., load 82.

Figure 3:
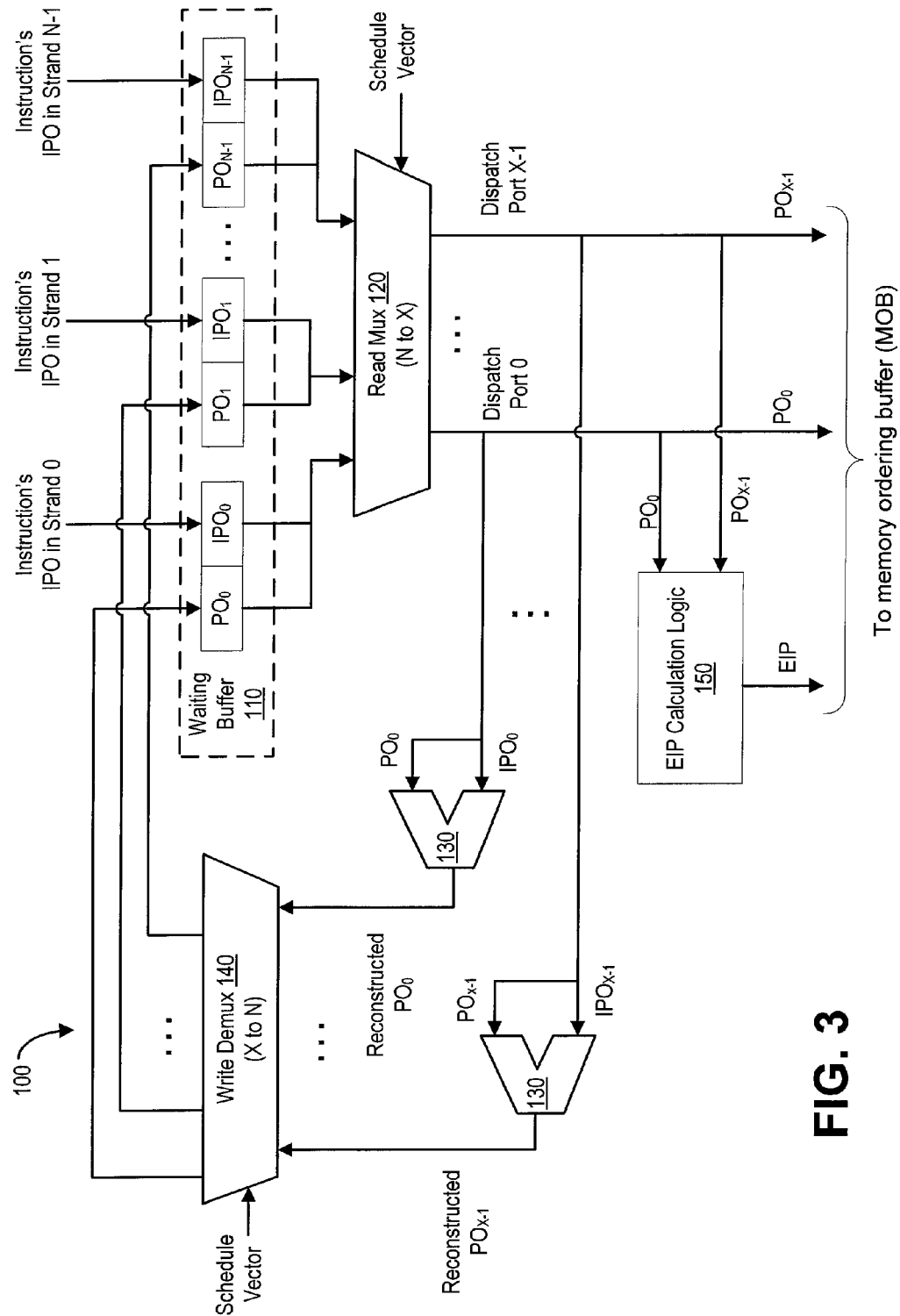
FIG. 3 illustrates elements of a hardware arrangement for reconstructing program order according to one embodiment.

FIG. 3 is a block diagram of a hardware arrangement 100 for reconstructing real program order of instructions in a multi-strand OoO processor. The arrangement may be implemented as part of an instruction scheduler unit (ISU) within a multi-strand OoO processor. Alternatively, the arrangement may be a standalone circuit that communicates with an ISU in a multi-strand OoO processor to perform reconstruction of program order.

The arrangement 100 may include a waiting buffer 110, logic for program order reconstruction (e.g. a plurality of PO reconstruction units 130 and a write demultiplexer 140), and a logic unit 150 for calculation of an Executed Instruction Pointer (EIP).

The waiting buffer 110 stores a plurality of entries, each of which keeps the PO of an instruction being scheduled (being considered) for execution as well as corresponding IPOs for the instructions. The waiting buffer 110 is analogous to the reservation station in a superscalar processor in that it allocates every instruction that needs to be executed, and de-allocates it as soon as it's dispatched for execution. For PO instructions, each entry of the waiting buffer 110 may comprise a PO-IPO pair that is associated with a head instruction in a strand. For example, if the multi-strand OoO processor supports the parallel execution of N strands, the waiting buffer 110 may store N PO-IPO pairs. The waiting buffer 110 outputs the PO-IPOs to the read multiplexer 120. The entries in the waiting buffer 110 may also correspond to non-PO instructions which, as previously explained, may not include an IPO encoding. In such instances, the waiting buffer 110 entry may only include a PO value for the non-PO instruction, along with a zero or null value in the IPO field. Since the PO value of the next PO instruction in the strand has been calculated by the previous PO instruction (i.e., by adding the IPO of the previous PO instruction), the PO value of non-PO instructions can be set equal to the PO value of the next PO instruction in the strand. Additionally, in clock cycles when there is no instruction in the waiting buffer 110 for a strand (e.g. the previous instruction has been executed, and the next one has not yet been fetched so that the buffer entry for that strand is empty), the PO field continues to contain the PO of the previous PO instruction, which continues to be used in the calculation of the EIP (by finding the minimal PO across all strands, as discussed below in connection with an EIP calculation logic 150).

The read multiplexer 120 may be implemented as a single (N to X) multiplexer that receives the PO-IPO pairs in the waiting buffer 110. Each clock cycle, the read multiplexer 120 may select up to all N entries for forwarding to X number of dispatch ports in the read multiplexer 120. The number of entries selected for dispatch depends on the number of PO instructions indicated by the ISU as being scheduled for execution in any given clock cycle and may vary from cycle to cycle. The read multiplexer 120 only dispatches PO and IPO values for PO instructions and does not dispatch PO values for non-PO instructions. The scheduled (PO) instructions are indicated using a schedule vector input into the read multiplexor 120. The schedule vector is output from the ISU and indicates which of the N instructions are PO instructions that have been scheduled and are ready for dispatch. In another embodiment, the PO and IPO values may be kept in separate buffers (i.e., the waiting buffer is split into two buffers), so the read multiplexer 120 may be implemented using two buffers, one for dispatching the PO value and one for dispatching the IPO value. The selected PO-IPO pairs are simultaneously output to the MOB and to the PO reconstruction units 130.

The reconstruction logic may include a plurality of PO reconstruction units 130, each of which is configured to reconstruct the PO of an instruction coming into the waiting buffer 110, by using a corresponding PO-IPO pair output from the read multiplexer 120. A reconstruction unit 130 may be provided for each of the dispatch ports of the read multiplexer 120 (i.e., N dedicated reconstruction units). In one embodiment, each reconstruction unit 130 may include arithmetic logic that combines the PO and the IPO to form the reconstructed PO. In one embodiment, the PO and IPO may be combined using binary addition. However, other arithmetic operations may alternatively be used depending on how the compiler has calculated the IPOs in relation to the POs.

The write demultiplexer 140 may be implemented using one or more multiplexers, e.g., a single (X to N) multiplexer, that together receive the reconstructed POs from the reconstruction units 130. As with the read multiplexer, the write demultiplexer 140 may be controlled by the schedule vector from the ISU. Thus, the write demultiplexer 140 may select the reconstructed POs of up to N instructions for forwarding to the waiting buffer 110. In this manner, a feedback loop is formed in which the POs of previous instructions in the waiting buffer 110 are used to calculate (reconstruct) the POs of subsequent instructions in corresponding entries in the waiting buffer 110, where the reconstructed POs correspond to the real program order of the PO instructions that have been scheduled for execution.

The EIP calculation logic 150 includes logic for calculating the EIP based on the PO values of all strands active at this time, regardless of whether an instruction of the strand is dispatched in this cycle or not, and regardless of whether the last dispatched instruction is a PO instruction or a non-PO instruction. Specifically, the EIP is selected to be equal to the minimum PO value of the next PO instructions among all currently running strands (the instruction having a PO value equal to the EIP is therefore the oldest instruction amongst all PO instructions that have not been dispatched yet from the waiting buffer 110). For example, the EIP may be calculated at the instruction issue stage of an execution pipeline (this coincides with when the PO-IPO pairs are dispatched from the read multiplexer 120), by comparing the PO value of each instruction currently being dispatched (if any) to the value of the existing EIP and updating the EIP to equal the lowest of the compared values.

The MOB (not shown) may be implemented as a single hardware buffer or a plurality of hardware buffers that contain entries corresponding to load instructions, store instructions, and optionally other types of instructions (e.g., arithmetic instructions) that have been not yet been retired. The MOB may perform functions similar to those discussed above in connection with the OoO superscalar and VLIW processors. For example, the MOB may perform reordering of PO instructions (but not the other types of instructions) within the instruction scheduling window for purposes of retirement. In particular, the MOB checks memory dependencies of the PO instructions after the PO instructions have been executed and are awaiting retirement, and adjusts the order in which the PO instructions retire so as to handle any existing memory dependencies. Since retirement modifies the state of the processor, i.e., real memory, this ensures the correct state of the processor.

The MOB receives the EIP and the PO of the PO instructions from the EIP calculation logic 150 and the read multiplexer 120, respectively. Dispatched PO instructions are stored in the MOB along with their corresponding dispatched POs, together with other contents such as the corresponding memory addresses of the instructions (i.e., a destination operand address of a store or a source operand address for a load). The MOB does not store non-PO instructions. The buffers of the MOB may include a load buffer (LDB), a store buffer (STB) and an interruptible instructions buffer (JIB), which respectively hold the executed results of load, store and interruptible instructions. In one embodiment, the buffers may have a structure similar to that used in a conventional ARB, where memory instructions are directed to bins based on their memory (destination) address, and the bins are used to enforce program order amongst the memory accesses to the same address with the help of the reconstructed PO of each PO instruction and the EIP value (which has been pre-calculated by the time the PO instructions are ready for retirement reordering). The entries of the MOB may therefore be indexed by their memory addresses. Alternatively MOB entries may be indexed using dispatched PO values. Other indexing methods, such as random entry allocation, may also be used to index the MOB entries.

To restore correct program order, in which memory accesses are performed, and to ensure correct execution semantics amongst instructions from different strands, an associative search may be performed on the MOB based on the EIP value and/or based on the dispatched PO values of each PO instruction. The general procedure for associative search and retirement reordering is known and will not be discussed further. However, it should be noted that the EIP and dispatched PO values facilitate reordering by allowing the MOB to easily determine the PO value of PO instructions in one strand relative to the PO instructions in other running strands. For example, the dispatched PO of an executed load instruction that is ready for retirement may be compared to the EIP. If the load dispatched is older than the EIP according to PO comparison rules which are described further herein, then it is guaranteed that the load is older than any dispatched stores which have yet to be executed. However, if the load is younger than the EIP, then any store instruction having the same address and which is older than the load (as determined by the comparing the dispatched PO values of the load and store) but having not yet executed must be allowed to execute and retire first before the load can retire. It will also be appreciated that the EIP and dispatched PO values may be used to facilitate memory disambiguation (e.g., handling memory dependencies for purposes of instruction execution), as would be understood by one of ordinary skill in the art.

Figure 4:
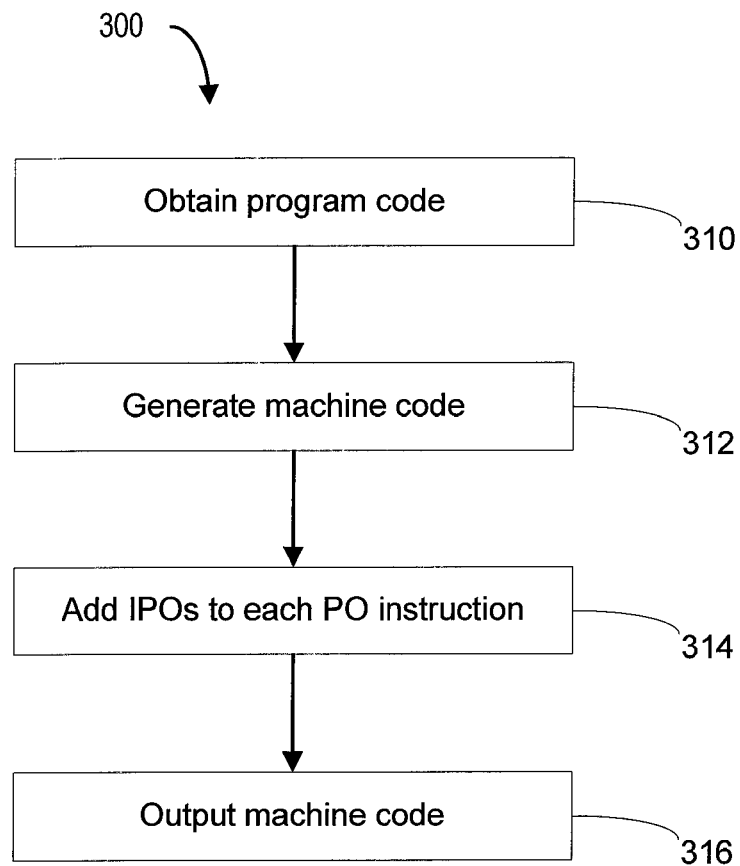
FIG. 4 illustrates a method for generating machine code according to one embodiment.

FIG. 4 illustrates a method 300 for generating machine code according to one embodiment.

At 310, a compiler obtains program code written, for example, in a high level programming language such as C or Java.

At 312, the compiler generates machine code in which machine instructions are organized into a plurality of progressive sequences, called strands, such that each strand is a subset of the single original progressive sequence of instructions representing the program order, and PO values of each PO instruction are assigned according to their respective position in this overall sequence. Later, PO values are translated into IPO according to the difference in PO values between instructions of the same strand, as discussed above in connection with FIG. 2.

At 314, the compiler adds IPO values to the instruction format of each PO instruction.

At 316, the compiler outputs the machine code, which now includes the IPO values, for execution on a multi-strand OoO processor.

Figure 5:
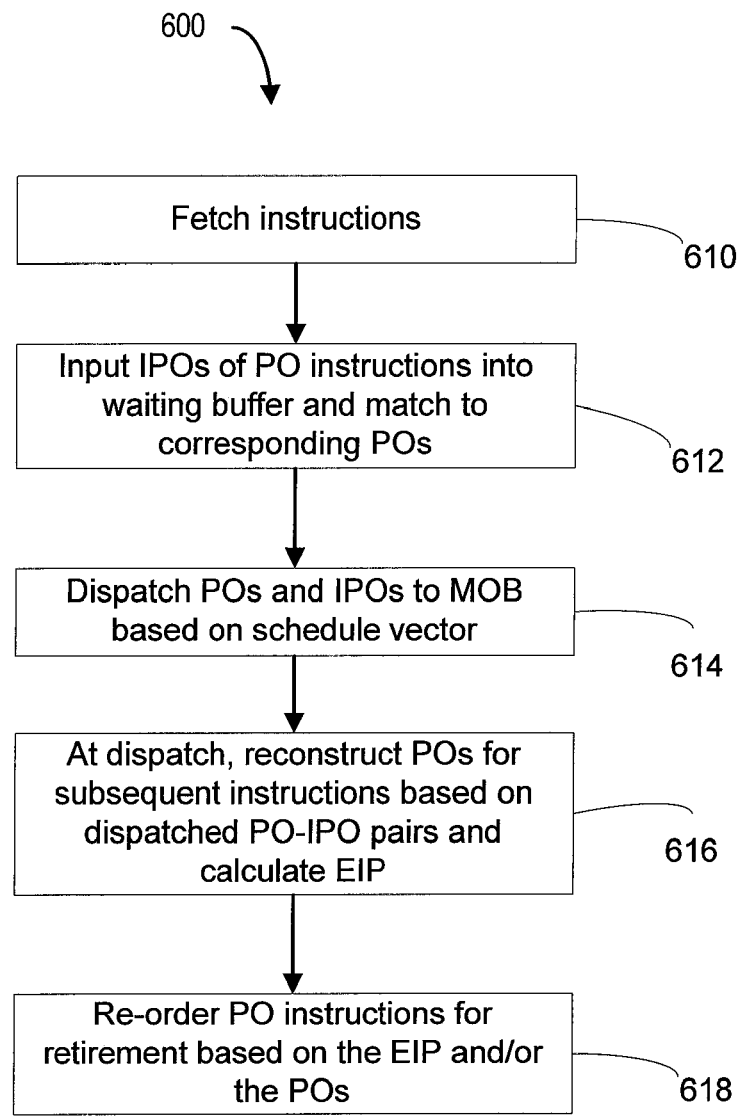
FIG. 5 illustrates a method for reconstructing program order according to one embodiment.

FIG. 5 illustrates a method 600 for reconstructing POs according to one embodiment.

At 610, a multi-strand OoO processor fetches instructions, e.g., the machine code output by the compiler in the method 300 described above.

At 612, the instructions are allocated, e.g., by an ISU in the processor, to await execution.

At 614, if the compiler assigned an IPO to an instruction, the instruction's IPO is input into the waiting buffer 110. At this time, the IPO is matched to the instruction's PO, which is reconstructed from the PO-IPO pair of the previous PO instruction in the same entry, i.e., the same strand.

At 616, the PO-IPO pairs are dispatched to the MOB based on the schedule vector.

Also at dispatch, the POs of subsequent PO instructions are reconstructed using the dispatched PO-IPO pairs. Additionally, the EIP calculation logic 150 may update the EIP value based on the PO values being dispatched (618).

At 620, any PO instructions that have been executed and that are awaiting retirement may be re-ordered by the MOB based on the EIP and/or the POs stored in the MOB.

Figure 6:
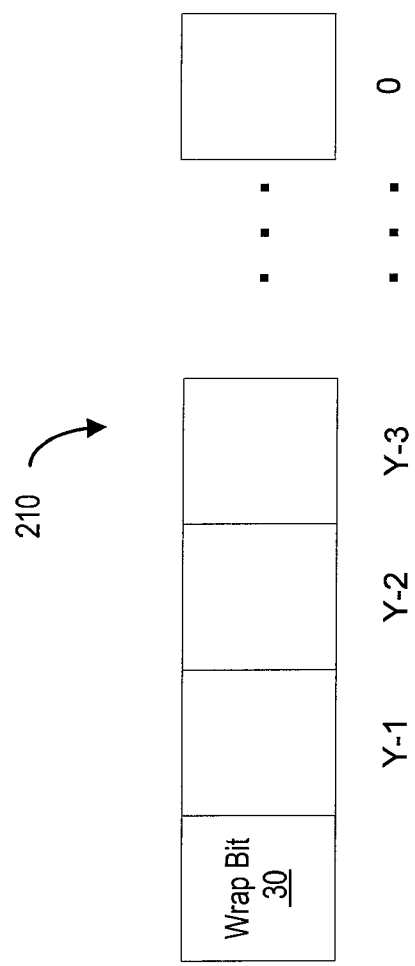
FIG. 6 illustrates a program order encoding format according to one embodiment.

FIG. 6 illustrates a PO encoding format 210 according to one embodiment. In a conventional PO encoding, the PO is limited to Y+1 bits of representation. In accordance with an embodiment of the present invention, the most significant bit (MSB) of a PO encoding format 210 may be used as a wrap bit 30. Accordingly, the IPO may be encoded using Z bits, where Z is less than Y.

During PO reconstruction, the wrap bit 30 is inverted if the PO value exceeds $2^{Y-1}-1$. The compiler also ensures that the difference between the maximum and minimum PO values of any PO instructions within the instruction scheduling window doesn't exceed $2^{Y-1}-1$. This is because if the size of the scheduling window is such that the PO values are allowed to wrap around more than once, it would be impossible for the EIP calculation logic to tell whether instruction A has smaller or greater PO than instruction B because it will not be possible to distinguish two cases: 1) instruction A has the same wrap bit as instruction B and a smaller PO and 2) instruction A has different a wrap bit and a larger PO than instruction B.

Comparators in the EIP calculation logic unit 150 may take the wrap bit 30 into account during comparison of instruction POs. Having limited the instruction scheduling window size in the manner described above, the following algorithm may be applied to compare the PO of instructions A and B:

If the wrap bits of A and B are equal, then A is older than B if PO[Y-1:0] bits of A are numerically less than PO[Y-1:0] of B, and If the wrap bits of A and B are not equal, then A is older than B if PO[Y-1:0] bits of A are numerically greater than PO[Y-1:0] of B.

Figure 7:
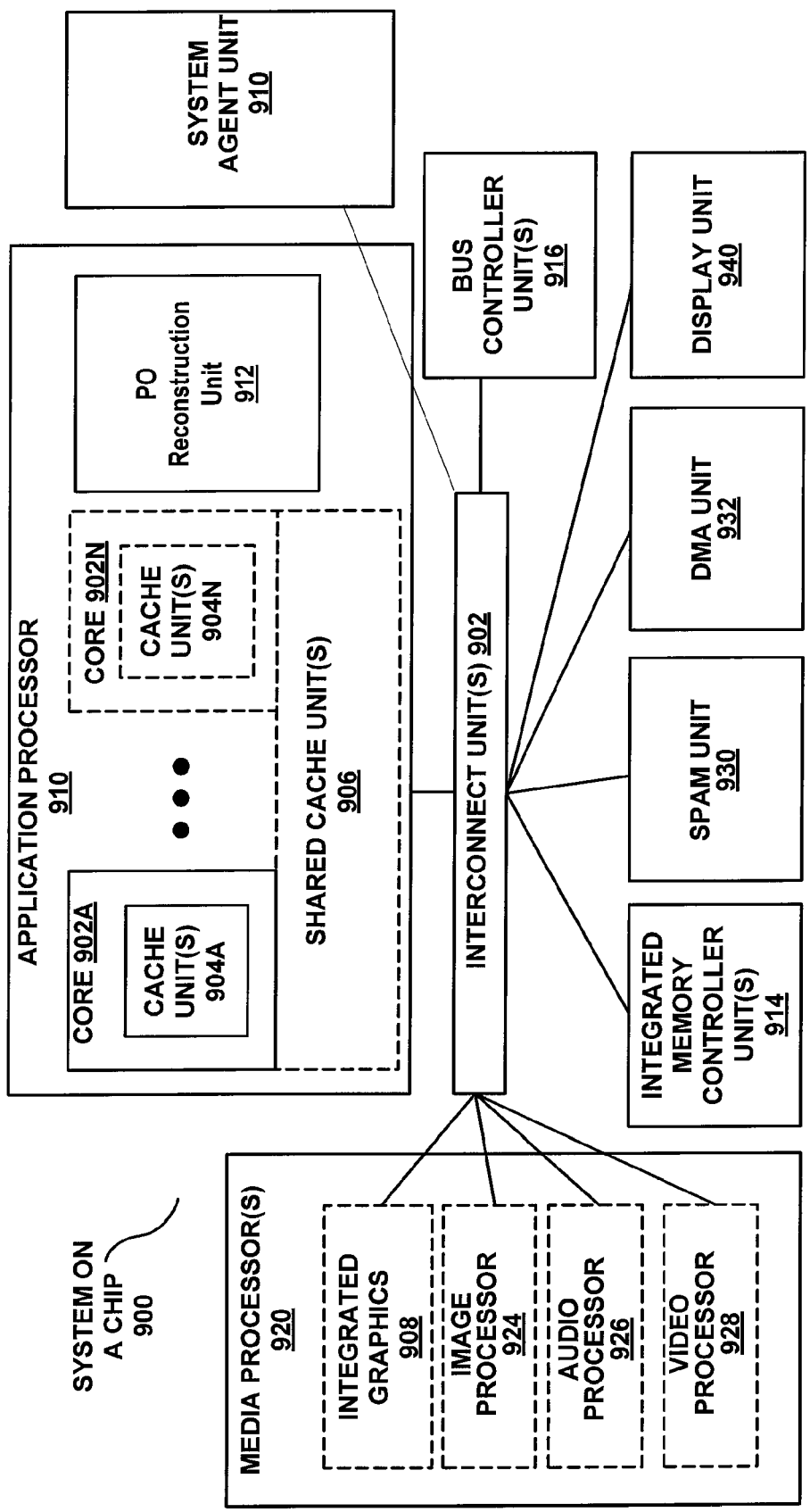
FIG. 7 is a block diagram of a system-on-a-chip according to one embodiment.

FIG. 7 is a block diagram of a system on a chip (SoC) 900 in accordance with an embodiment of the present invention. In FIG. 7, an interconnect unit(s) 902 is coupled to: a multi-strand OoO application processor 910 which includes a set of one or more cores 902A-N and shared cache unit(s) 906; a system agent unit 910; a bus controller unit(s) 916; an integrated memory controller unit(s) 914; a set or one or more media processors 920 which may include integrated graphics logic 908, an image processor 924 for providing still and/or video camera functionality, an audio processor 926 for providing hardware audio acceleration, and a video processor 928 for providing video encode/decode acceleration; a static random access memory (SRAM) unit 930; a direct memory access (DMA) unit 932; and a display unit 940 for coupling to one or more external displays. The application processor 910 may also include a PO reconstruction unit 512, such as the hardware arrangement 100 in FIG. 3.

The example embodiments of the present invention described above provide several significant advantages in terms of better ILP utilization, hardware optimization, and ISA optimization (i.e., facilitating the work of the compiler).

ILP is better exploited because in comparison with previous solutions, the explicit PO information encoded in each instruction facilitates the highly-parallel OoO fetching and execution of multiple strands. ILP is also better exploited because calculating the EIP at the dispatch stage improves retirement throughput by allowing large groups of load instructions to retire simultaneously.

Hardware optimization is achieved through savings in area and mitigation of power and timing limitations. By encoding only the IPO instead of the entire PO value in memory and interruptible instructions, instruction size is limited and consequently area savings are achieved by requiring fewer hardware (e.g., buffers to hold an instruction and logic which operates on these instructions like muxes/demuxes, decoders, etc.)

The IPO encoding supports program loops (where the same static instruction occurs (executes) more than once with different PO values but the same IPO). Since the IPO value remains the same during each subsequent loop iteration, the next PO value of the loop can be computed by adding the same IPO to the previous PO value for the loop.

By considering only dispatched memory and interruptible instructions (i.e., PO instructions) for reconstructing actual PO, the number of reconstruction logic units 130 is reduced (in FIG. 2, reconstruction units 130 are only provided for X dispatched instructions out of N total ready instructions in the waiting buffer 110). In contrast, in an OoO superscalar processor, PO is reconstructed in the reorder buffer, which includes (and therefore must consider) arithmetic and integer instructions in addition to PO instructions.

By calculating EIP at the instruction issue (dispatch) stage instead of calculating it in the MOB at retirement, pipeline latency and power consumption is improved compared to other ordering schemes based on associative searches in the MOB.

ISA optimization is achieved through reconstruction of the program order at the allocation stage, which allows the sequence of PO values in any particular strand to be non-consecutive. Because instructions don't have to be arranged in using consecutive PO values, additional compiler optimizations may become available for use with the instructions, so that it becomes easier for the compiler to calculate the IPO values.

Although the above examples describe instruction handling and distribution in the context of processing elements and logic circuits, other embodiments of the present invention can be accomplished by way of data or instructions stored on a non-transitory, machine-readable, tangible medium, which when performed by a machine cause the machine to perform functions consistent with at least one embodiment of the invention. In one embodiment, functions associated with embodiments of the present invention are embodied in machine-executable instructions. The instructions can be used to cause a general-purpose or special-purpose processor that is programmed with the instructions to perform the steps of the present invention. Embodiments of the present invention may be provided as a computer program product or software which may include a machine or computer-readable medium having stored thereon instructions which may be used to program a computer (or other electronic devices) to perform one or more operations according to embodiments of the present invention. Alternatively, steps of embodiments of the present invention might be performed by specific hardware components that contain fixed-function logic for performing the steps, or by any combination of programmed computer components and fixed-function hardware components.

Instructions used to program logic to perform embodiments of the invention can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

In the preceding specification, the present invention has been described with reference to specific example embodiments thereof. It will, however, be evident that various modifications and changes may be made thereunto without departing from the broader spirit and scope of the present invention as set forth in the claims that follow. The embodiments described herein may be presented combined with each other in various combinations. The specification and drawings are accordingly to be regarded in an illustrative rather than restrictive sense.

What is claimed is:

1. A computer system that is configured to perform the following:
   dividing a set of computer instructions arranged in a sequential program order into a plurality of instruction sequences, wherein instructions within each sequence are arranged and executed according to the program order, but executed out-of-order relative to instructions in other sequences;
   assigning increment values to individual program-ordered (PO) instructions in each sequence, wherein each increment value is equal to a difference between a program order value of a subsequent PO instruction in the sequence and a program order value of the PO instruction, and wherein the increment value is encoded into the PO instruction; and
   at a processor of the system, reconstructing the program order of instructions in each sequence relative to the program order of instructions in the other sequences by:
      calculating the program order value of PO instructions based on the program order value and the increment value of a preceding PO instruction in the same sequence, wherein the calculating is repeated for each sequence, and
      setting the program order value of non-PO instructions to the calculated program order value of a next PO instruction.

2. The computer system of claim 1, wherein the processor is a multi-strand out-of-order processor configured to execute each of the sequences as a separate strand.

3. The computer system of claim 1, wherein the PO instructions include load instructions, store instructions and instructions that are capable of triggering interrupts.

4. The computer system of claim 1, wherein the system is further configured to perform:
   storing program order values of head instructions in each sequence, together with corresponding increment values assigned to the head instructions, as entries in a waiting buffer having a separate entry for each sequence; and
   dispatching selected head instructions, together with their corresponding program order values, into a memory ordering buffer that performs the handling of data dependencies by retiring the instructions according to their reconstructed program order.

5. The computer system of claim 4, wherein the system is further configured to perform:

simultaneously dispatching the program order values together with corresponding increment values of the selected head instructions to reconstruction units in the processor, which are configured to perform the calculating of the reconstructed program order values for instructions subsequent to the head instructions.

6. The computer system of claim 4, wherein the system is further configured to perform:
setting a pointer value equal to a lowest program order value amongst the program order values of the selected head instructions that will be dispatched next in each of the strands; and
determining that an instruction can retire if the reconstructed program order of the instruction indicates that the instruction is older than the instruction associated with the pointer value.

7. The computer system of claim 1, further comprising a compiler configured to perform the assigning of the increment values and to output machine code including the assigned increment values to the processor.

8. A processor, comprising:
an instruction fetch unit configured to obtain a set of computer instructions arranged in a sequential program order and divided into a plurality of instruction sequences, wherein:
instructions within each sequence are arranged and executed according to the program order, but executed out-of-order relative to instructions in other sequences, and
increment values are assigned to individual program-ordered (PO) instructions in each sequence, each increment value being equal to a difference between a program order value of a subsequent PO instruction in the sequence and a program order value of the PO instruction, and wherein the increment value is encoded into the PO instruction; and
a plurality of reconstruction units, each of which is configured to calculate the program order value of a PO instruction based on the program order value and the increment value of a preceding PO instruction in the same sequence, wherein the calculating is repeated for each sequence,
wherein the processor reconstructs the program order of instructions in each sequence relative to the program order of instructions in the other sequences by, in addition to the calculating of the program order values for the PO instructions, setting the program order value of non-PO instructions to the calculated program order value of a next PO instruction.

9. The processor of claim 8, wherein the processor is a multi-strand out-of-order processor configured to execute each of the plurality of sequences as a separate strand.

10. The processor of claim 8, wherein the PO instructions include load instructions, store instructions and instructions that are capable of triggering interrupts.

11. The processor of claim 8, further comprising:
a waiting buffer that stores the program order values of head instructions in each sequence, together with corresponding increment values assigned to the head instructions, as entries in a waiting buffer having a separate entry for each sequence; and
a dispatch arrangement configured to dispatch selected head instructions, together with their corresponding program order values, into a memory ordering buffer that performs the handling of data dependencies by retiring the instructions according to their reconstructed program order.

12. The processor of claim 11, wherein the dispatch arrangement is further configured to:
simultaneously dispatch the program order values together with corresponding increment values of the selected head instructions to the reconstruction units, which then perform the calculating of the reconstructed program order values for instructions subsequent to the head instructions.

13. The processor of claim 11, further comprising:
a pointer calculation unit configured to set a pointer value equal to a lowest program order value amongst the program order values of the selected head instructions that have been dispatched, wherein the processor determines that an instruction can retire if the reconstructed program order of the instruction indicates that the instruction is older than the instruction associated with the pointer value.

14. The processor of claim 8, wherein the processor obtains the plurality of sequences of computer instructions from a compiler that performs the assigning of the increment values.

15. A computer-implemented method, comprising:
dividing a set of computer instructions arranged in a sequential program order into a plurality of instruction sequences, wherein instructions within each sequence are arranged and executed according to the program order, but executed out-of-order relative to instructions in other sequences;
assigning increment values to individual program-ordered (PO) instructions in each sequence, wherein each increment value is equal to a difference between a program order value of a subsequent PO instruction in the sequence and a program order value of the PO instruction, and wherein the increment value is encoded into the PO instruction; and
at a processor of the system, reconstructing the program order of instructions in each sequence relative to the program order of instructions in the other sequences by:
calculating the program order value of PO instructions based on the program order value and the increment value of a PO instruction in the same sequence, wherein the calculating is repeated for each sequence, and
setting the program order value of non-PO instructions to the calculated program order value of a next PO instruction.

16. The method of claim 15, wherein the processor is a multi-strand out-of-order processor configured to execute each of the plurality of sequences as a separate strand.

17. The method of claim 15, wherein the PO instructions include load instructions, store instructions and instructions that are capable of triggering interrupts.

18. The method of claim 15, further comprising:
storing program order values of head instructions in each sequence, together with corresponding increment values assigned to the head instructions, as entries in a waiting buffer having a separate entry for each sequence; and
dispatching selected head instructions, together with their corresponding program order values, into a memory ordering buffer that performs the handling of data dependencies by retiring the instructions according to their reconstructed program order.

19. The method of claim 18, further comprising:
simultaneously dispatching the program order values together with corresponding increment values of the selected head instructions to reconstruction units in the processor, which are configured to perform the calculating of the reconstructed program order values for instructions subsequent to the head instructions.

20. The method of claim 18, further comprising:
setting a pointer value equal to a lowest program order value amongst the program order values of the selected head instructions that will be dispatched next in each of the sequences; and
determining that an instruction can retire if the reconstructed program order of the instruction indicates that the instruction is older than the instruction associated with the pointer value.

21. The method of claim 15, wherein the assigning of the increment values is performed at a compiler that outputs machine code including the assigned increment values to the processor.

* * * * *

UNITED STATES PATENT AND TRADEMARK OFFICE
CERTIFICATE OF CORRECTION

| | | |
|---|---|---|
| PATENT NO. | : 9,811,340 B2 | Page 1 of 1 |
| APPLICATION NO. | : 13/525825 | |
| DATED | : November 7, 2017 | |
| INVENTOR(S) | : Nikolay Kosarev et al. | |

It is certified that error appears in the above-identified patent and that said Letters Patent is hereby corrected as shown below:

In the Claims

In Column 14 Line 41, in Claim 15, before "PO" insert -- preceding --.

Signed and Sealed this
Twenty-third Day of January, 2018

Joseph Matal
*Performing the Functions and Duties of the*
*Under Secretary of Commerce for Intellectual Property and*
*Director of the United States Patent and Trademark Office*